Figure 1:
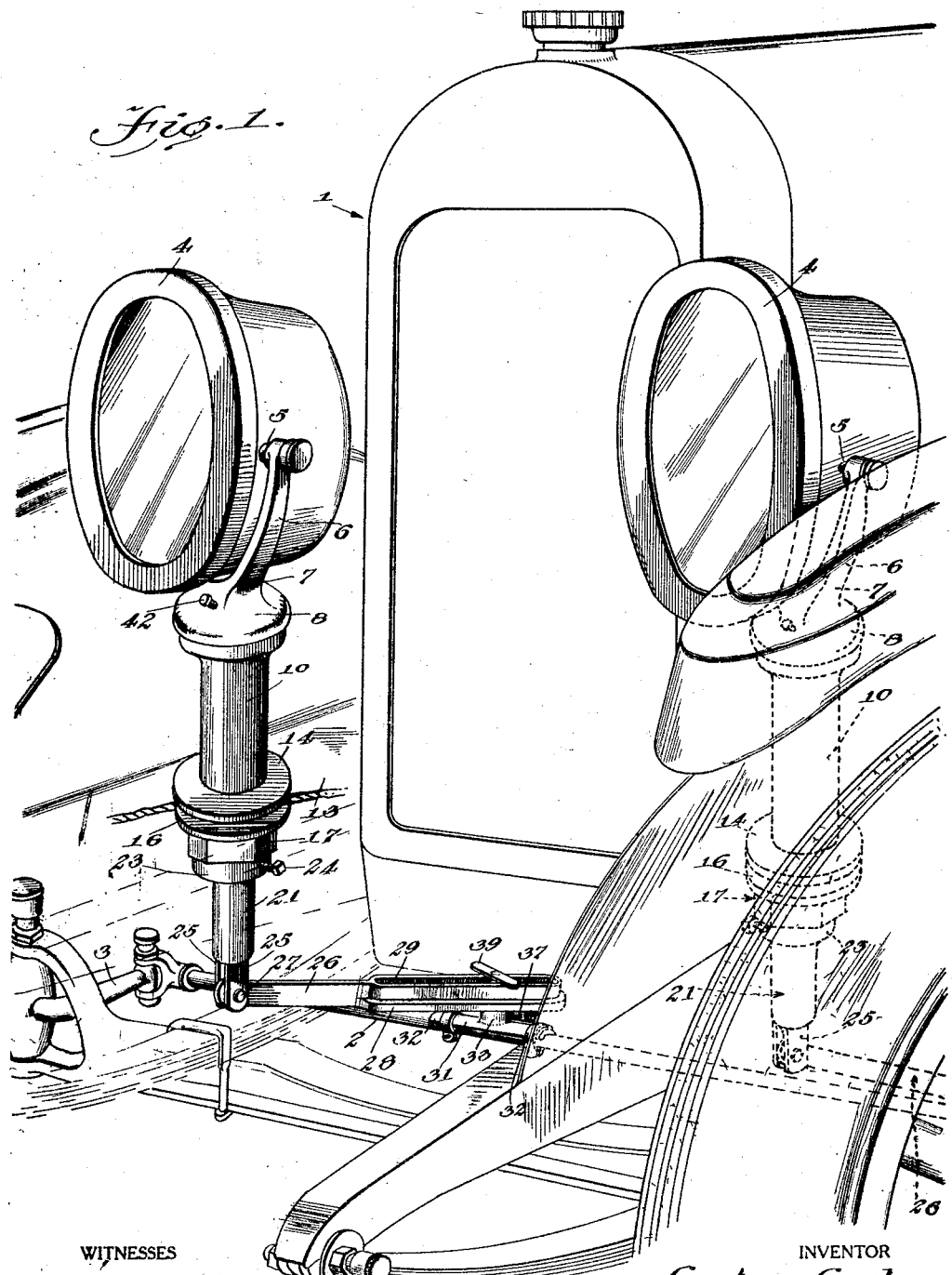

Oct. 20, 1925.

G. COOK 1,558,343

HEADLIGHT

Filed Feb. 14, 1925

2 Sheets-Sheet 1

WITNESSES

INVENTOR
Gustave Cook,
BY
ATTORNEYS

Oct. 20, 1925.
G. COOK
HEADLIGHT
Filed Feb. 14, 1925
1,558,343
2 Sheets-Sheet 2
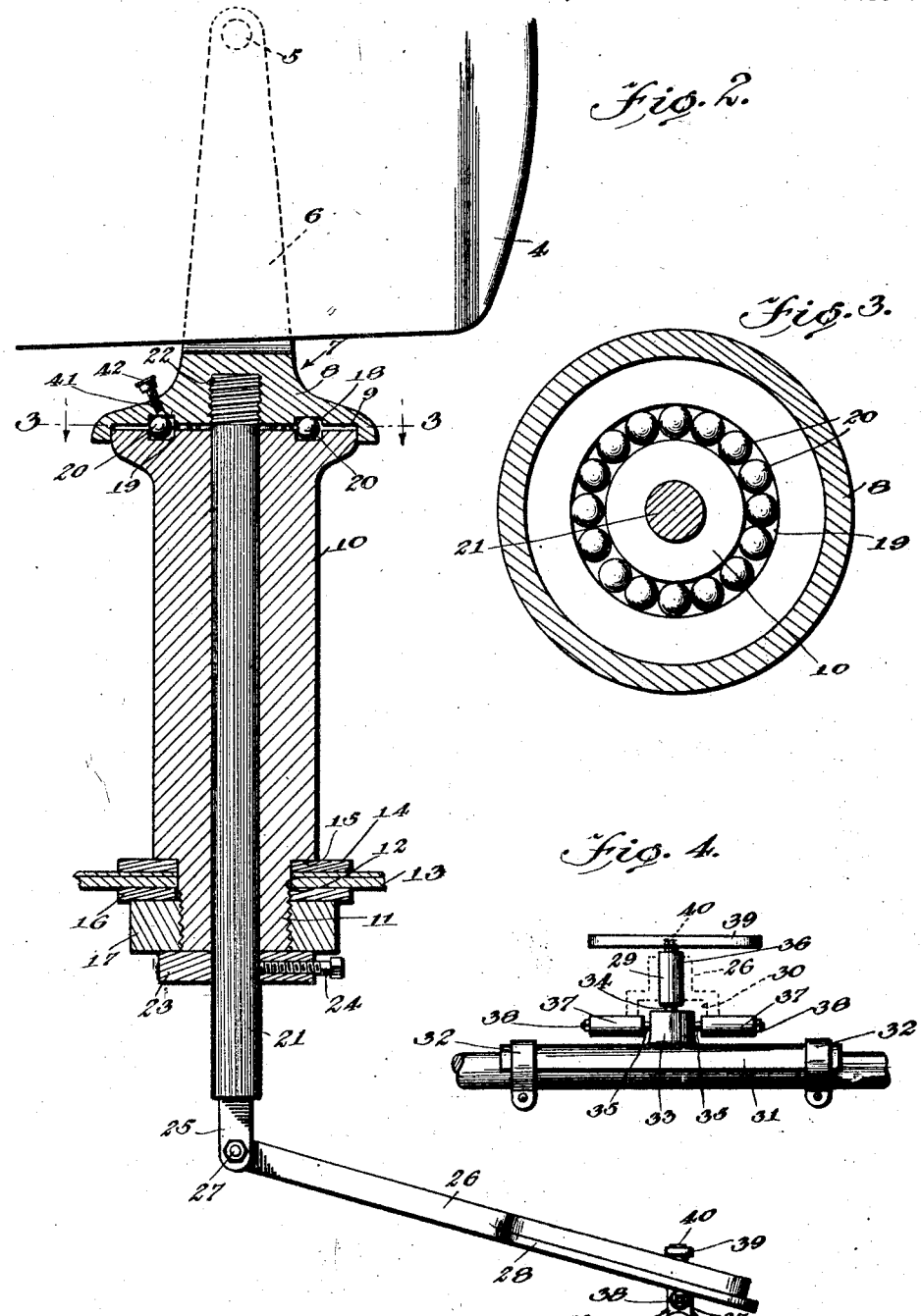
WITNESSES
INVENTOR
Gustave Cook,
BY
ATTORNEYS Patented Oct. 20, 1925.

1,558,343

UNITED STATES PATENT OFFICE.

GUSTAVE COOK, OF GILLETT, WISCONSIN.

HEADLIGHT.

Application filed February 14, 1925. Serial No. 9,254.

*To all whom it may concern:*

Be it known that I, GUSTAVE COOK, a citizen of the United States, and a resident of Gillett, in the county of Oconto and State of Wisconsin, have invented certain new and useful Improvements in Headlights, of which the following is a specification.

My invention relates to improvements in headlights for vehicles, and it consists in the combinations, constructions and arrangements herein described and claimed.

An object of the invention is the provision of simple and efficient means for supporting headlights of an automobile so that such headlights will turn with the steering wheels of the automobile and rays of light therefrom will be projected directly in advance of the automobile, irrespective of whether or not the automobile is proceeding along a straight path or is turning a corner.

A further object of the invention is the provision of a means for supporting a headlight and for attaching the headlight to the steering mechanism of an automobile without any change being required in the usual construction of the steering mechanism.

A still further object of the invention is the provision of an improved means for supporting the headlight of an automobile so that motion will be transmitted thereto from the steering mechanism of the automobile without any appreciable friction or noise resulting from the operation of the headlight supporting means.

Other objects and advantages of the invention will be apparent from the following description, considered in conjunction with the accompanying drawings, in which:—

Figure 1 is a fragmentary perspective view, showing the headlights of an automobile supported and connected with the steering mechanism of the automobile by means embodying the invention, Figure 2 is a relatively enlarged view, partly in side elevation and partly in vertical section, showing the supporting and operating elements for one of the headlights, Figure 3 is a section along the line 3—3 of Figure 2 and, Figure 4 is a fragmentary side elevation of a portion of the transverse connecting rod of the usual steering mechanism and the elements which the invention provides for attaching the supporting and operating means for one of the headlights to the cross connecting rod.

In Figure 1 I show more or less diagrammatically the front end portion of an automobile, indicated generally at 1. A cross connecting rod 2 provides the usual means for transmitting motion from one of the steering arms, such as that indicated at 3 to the other steering arm, not shown, so that the front or steering wheels of the automobile will turn in unison when the connecting rod 2 is moved axially. Motion to effect steering of the automobile may be imparted to the connecting rod 2 by any suitable known means under the control of the driver of the automobile, no means being shown in the drawings.

The parts described so far are ordinary in construction and form no part of the invention except in so far as they cooperate with the parts which will now be described.

A pair of headlights 4 is provided for the automobile. Each of these headlights is supported and connected by means embodying the invention to the connecting rod 2 so that the headlight will turn about a vertical axis as the steering wheels of the automobile are turned and in the same direction as the steering wheels so that the headlights will project rays of light directly in front of the automobile, irrespective of the direction of movement of the automobile. The means for supporting one of the headlights 4 for actuation by the connecting rod 2 is precisely identical with the means for supporting the other headlight for actuation by the same connecting rod and I therefore shall confine my description to the supporting and operating means for one headlight, it being understood that the supporting and operating means for the other headlight comprises identical parts.

The headlight casing is carried between a pair of alined horizontal pins, as at 5, which extend through alined openings in the upper end portions of the upstanding forks 6 of a lamp supporting yokes 7. The yoke 7 has a base 8 which is formed with a central recess 9 in its bottom. The recess 9 is preferably circular in cross-section and receives the enlarged upper end portion of a tubular standard 10. The standard 10 has a reduced lower end portion 11 depending through a vertical opening 12 in a fender 13 or other stationary supporting part of the automobile. A washer 14 may be interposed between the shoulder 15 at the upper end of the reduced lower end portion 11 and the supporting fender 13. A similar washer 16 may be disposed on the reduced lower end portion 11 between the lower face of the fender 13 and a clamping nut 17 which is in threaded engagement with the reduced lower end portion 11 of the tubular standard.

The base 8 of the yoke and the upper end of the tubular standard 10 have annular grooves 18 and 19, respectively, in the confronting faces thereof. These grooves 18 and 19 cooperate to form a runway or race for ball bearings 20 which anti-frictionally support the yoke 7 on the tubular standard 10 for rotation about a vertical axis which extends centrally of the tubular standard 10.

A means for turning the yoke 7 and therefore the headlight that is supported on the yoke about the aforesaid vertical axis comprises a shaft 21 which extends through the bore of the tubular standard 10 and has the upper end portion thereof provided with external screw threads in engagement with screw threads on the wall of a central socket 22 in the base 8 of the lamp carrying yoke. The shaft 21 is rotatable about its longitudinal axis but is held against any appreciable axial movement upward by a stop collar 23 which encircles the shaft 21 at the lower end of the tubular standard 10 and is secured to the shaft 21 by a set screw 24.

The shaft 21 is formed with a pair of spaced depending ears or lugs 25 at its lower end provided with alined horizontal openings. A link 26 for transmitting motion from the connecting rod 2 to the shaft 21 comprises a rod-like member having one end portion thereof disposed between the depending lugs 25 and being attached to the lugs 25 by a horizontal bolt 27 which extends through the alined openings in the lugs 25 and through an opening in the portion of the link 26 which is interposed between the lugs 25. The other end portion of the link 26 is enlarged laterally in opposite directions for part of its thickness as indicated at 28 and is formed with a longitudinally extending slot 29 which is enlarged in width at its lower end as indicated at 30. An attaching plate 31 is secured on the connecting rod 2 by clamps 32 or like fastening devices so that a stud 33 which is integral with the attaching plate 31 will be upstanding from the upper part of the connecting rod. The stud 33 is formed with integral upstanding reduced upper end portion or pin projection 34 and with a pair of oppositely extending lateral pin projections 35. A roller 36 is disposed on the vertical pin projection 34 which extends through the slot 29. Rollers 37 are disposed on the horizontal pin projections 35 and are retained thereon by nuts 38. The laterally enlarged and slotted end portion of the link 26 rests upon the rollers 37. As stated, the roller 36 extends through the slot 29 for contact with the inner side walls of the slot and the link 26 is held against displacement from place on the rollers 37 by a retaining member or cross bar 39 which is in threaded engagement intermediate its ends as at 40 with the threaded upper end portion with the vertical pin projection 34.

From the foregoing description of various parts of the device, the operation thereof may be readily understood. The tubular standard 10 is supported on the fender 13 or other stationary part of the automobile so that the link 26 will extend obliquely to the direction of length of the connecting rod 2 of the steering mechanism. It therefore will be apparent that axial movement of the connecting rod 2 of the steering mechanism of the automobile will cause rocking of the shaft 21 about a vertical axis, the slotted portion of the link 26 moving relatively to the rollers 36 and 37 and being swung about the axis of the shaft 21 as the connecting rod 2 moves axially. The headlight therefore will be swung or turned about a vertical axis in the same direction as the steering wheels of the automobile.

The base 8 may be provided with an opening 41 in its upper part leading to the ball race 18—19 and a lubricant cup 42 may be arranged with the discharge end thereof secured in said opening.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. In a dirigible headlight supporting and operating device, a vertical shaft rotatably supported on a stationary part of a vehicle, said vehicle having the usual axially movable cross connecting rod between the steering arms for the steering wheels of the vehicle, a plate clamped on said connecting rod, said plate having an upstanding stud formed with a reduced upper end portion and with a pair of oppositely extending lateral pin projections, a roller disposed on said reduced upper end portion of the stud, other rollers mounted on the lateral pin projections, and a link attached at one end to the lower end of said shaft and having a longitudinally extending slot in which the roller on the reduced upper end portion of said stud works, the slotted portion of said link resting upon the rollers on said lateral pin projections, 2. In a device of the character described, a rotary vertical shaft, an axially movable horizontal rod adjacent to said vertical shaft, an upstanding stud on said rod, said stud having a pair of oppositely extending lateral projections located below the level of the upper end of said stud, and a link attached at one end to said vertical shaft and having a longitudinally extending slot in which the upper end portion of said stud may slide, the slotted portion of said link being slidably supported on said lateral projections on said stud.

3. In a device of the character described, a rotary vertical shaft, an axially movable horizontal rod adjacent to said vertical shaft, an upstanding stud on said rod, said stud having a pair of oppositely extending lateral projections located below the level of the upper end of said stud, the portion of said stud which extends above the level of said lateral projections being reduced, rollers on said lateral projections and a roller on the reduced upper end portion of said stud, and a link attached at one end to said vertical shaft and having longitudinal slot formed in a portion thereof, the upper portion of said slot being reduced in width for engagement with the roller on said reduced upper end portion of the stud and so that the slotted portion of said link may rest on the rollers on said lateral projections.

GUSTAVE COOK.